(12) United States Patent
Lambrecht et al.

(10) Patent No.: US 10,268,617 B2
(45) Date of Patent: Apr. 23, 2019

(54) FRAME FORMAT FOR A SERIAL INTERFACE

(71) Applicant: INTERNATIONAL BUSINESS MACHINES CORPORATION, Armonk, NY (US)

(72) Inventors: Lonny Lambrecht, Byron, MN (US); Michael S. Siegel, Raleigh, NC (US); William S. Starke, Round Rock, TX (US); Jeffrey A. Stuecheli, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/723,967

(22) Filed: Oct. 3, 2017

(65) Prior Publication Data

US 2018/0095921 A1    Apr. 5, 2018

Related U.S. Application Data

(60) Provisional application No. 62/403,561, filed on Oct. 3, 2016.

(51) Int. Cl.
| | |
|---|---|
| *G06F 13/16* | (2006.01) |
| *G06F 13/40* | (2006.01) |
| *G06F 13/42* | (2006.01) |

(52) U.S. Cl.
CPC ...... *G06F 13/4018* (2013.01); *G06F 13/1678* (2013.01); *G06F 13/4282* (2013.01)

(58) Field of Classification Search
CPC ............ G06F 13/4018; G06F 13/4282; G06F 13/1678
See application file for complete search history.

(56) References Cited

U.S. PATENT DOCUMENTS

| | | | | |
|---|---|---|---|---|
| 7,840,136 | B1* | 11/2010 | Cunningham | H04Q 3/66 385/16 |
| 2004/0098655 | A1* | 5/2004 | Sharma | H03M 13/091 714/758 |
| 2015/0280746 | A1* | 10/2015 | Sikkink | H03M 13/17 714/762 |
| 2018/0196774 | A1* | 7/2018 | Willey | G06F 13/4265 |

* cited by examiner

*Primary Examiner* — Glenn A. Auve
(74) *Attorney, Agent, or Firm* — Brian F Russell; Steven L Bennett

(57) ABSTRACT

An integrated circuit includes a transmitting circuit configured to be coupled to a physical serial interface having a bit width. The transmitting circuit is configured to transmit, via the physical serial interface, a frame including multiple aligned flits all of an equal fixed length that is an integer multiple of the bit width of the physical serial interface. The multiple flits include both a control flit specifying at least a command to be performed by a recipient of the command and a data flit providing data to be operated upon through performance of the command. The control flit includes a data protection code computed over the control flit and a data flit of a previously transmitted frame.

16 Claims, 10 Drawing Sheets

| Slot # | TL template field values | | | | | |
|---|---|---|---|---|---|---|
| | 00 | 01 | 02 | 03 | 06 | 07 |
| 0 | Return credits | 4-slot TL packet | 2-slot TL packet | 4-slot TL packet | 2-slot TL packet | 8-slot data |
| 1 | | | | | | |
| 2 | Reserved | | 2-slot TL packet | | 2-slot metadata | |
| 3 | | | | | | |
| 4 | 6-slot TL packet | 4-slot TL packet | ⋯ | 6-slot TL packet | 6-slot TL packet | |
| 5 | | | | | | |
| 6 | | | | | | |
| 7 | | | | | | ⋮ |
| 8 | | 4-slot TL packet | | 6-slot TL packet | | |
| 9 | | | | | | |
| 10 | Reserved | | | | | 2-slot metadata |
| 11 | | | | | 6-slot TL packet | 2-slot TL packet |
| 12 | | 4-slot TL packet | | | | 4-slot TL packet |
| 13 | | | | | | |
| 14 | | | 2-slot TL packet | | | |
| 15 | | | | | | |

*Figure 10*

FRAME FORMAT FOR A SERIAL INTERFACE

BACKGROUND OF THE INVENTION

The present invention relates to data processing and communication, and more specifically, to improved communication via a serial interface.

Serial interfaces are commonly employed in data processing systems to support communication between system components and input/output (I/O) or peripheral devices. Typically, data intended for transmission via the serial interface is received in units (frames) of one or more bytes, and these bytes are serialized into a stream of bits that is transmitted over the serial channel in bit order and byte order from a transmitting component to a receiving component. For example, if a frame containing four bytes is to be transmitted, bit 0 to bit 7 of the first byte is transmitted, followed by bit 0 to bit 7 of the second byte, followed by bit 0 to bit 7 of the third byte, and finally bit 0 to bit 7 of the fourth byte. The receiving component may then deserialize the serial stream of bits to reassemble the original frame.

In conventional serial interfaces, it is common at the data link layer for frames to be variable in length. As a consequence, the receiving component must fully receive and correctly decode a first frame in order for the receiving component to be able to correctly identify the beginning of a subsequent second frame and to correctly decode it. This restriction increases the complexity and processing latency of the receiving component, which may already have a significantly lower operating frequency than the transmitting component.

BRIEF SUMMARY

In at least one embodiment, an integrated circuit includes a transmitting circuit configured to be coupled to a physical serial interface having a bit width. The transmitting circuit is configured to transmit, via the physical serial interface, a frame including multiple aligned flits all of an equal fixed length that is an integer multiple of the bit width of the physical serial interface. The multiple flits include both a control flit specifying at least a command to be performed by a recipient of the command and a data flit providing data to be operated upon through performance of the command. The control flit includes a data protection code computed over the control flit and a data flit of a previously transmitted frame.

BRIEF DESCRIPTION OF THE SEVERAL VIEWS OF THE DRAWINGS

FIG. 10 is a table illustrating various templates that may be selected to define the structure of the transaction layer (TL) content field of a control flit of a frame in accordance with one embodiment.

DETAILED DESCRIPTION

Figure 1:
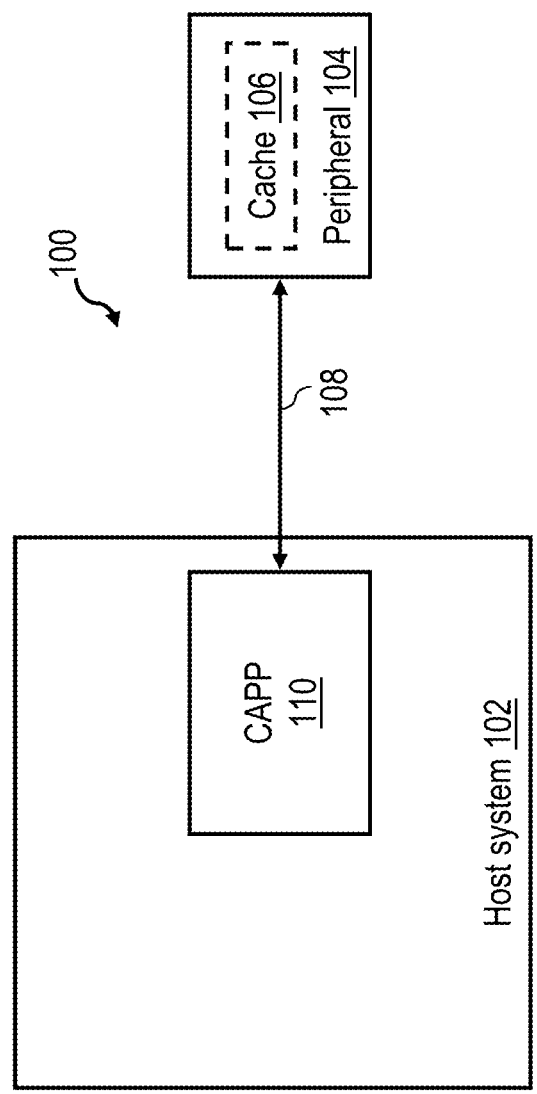
FIG. 1 is a high level block diagram of an exemplary data processing system in which a coherent device participates with a primary coherent system across a serial communication link through a proxy.

With reference now to the figures and with particular reference to FIG. 1, there is illustrated a high level block diagram of an exemplary data processing system 100 including a serial communication link. As shown, data processing system 100 includes a host system 102, which in one embodiment is a coherent multiprocessor computer system in which coherency of a distributed shared memory is maintained by implementation of a coherency protocol, such as the well-known MESI protocol or a variant thereof. In various embodiments, the coherency protocol can be directory-based or snoop-based.

As shown, the functionality of host system 102 can be expanded by coupling a peripheral component 104 to host system 102 by a serial communication link 108, which in some embodiments may include multiple lanes (i.e., individual 1-bit or multibit serial channels). In one example, peripheral component 104 may be implemented with a field programmable gate array (FPGA), application specific integrated circuit (ASIC), or other general or special-purpose processor or system. In some embodiments, peripheral component 104 may, for example, serve as a co-processor that off-loads predetermined processing tasks from host system 102 (e.g., encryption, compression, encoding, database searches, packet inspection, etc.), provide low cost expansion of the general-purpose processing capabilities or storage capacity of data processing system 100, and/or provide an interface to a heterogeneous system external to host system 102. In support of these and other possible functions of peripheral component 104, peripheral component 104 may include a cache 106 that holds local copies of memory blocks in the coherent memory address space of host system 102 to enable low latency access to those memory blocks by peripheral component 104.

In many cases, the technology utilized to implement peripheral component 104, cache 106, and/or serial communication link 108 has insufficient speed, bandwidth, and/or reliability to guarantee that peripheral component 104 can participate in the determination of the system-wide coherency responses for memory access requests within a bounded time frame required by the coherency protocol of host system 102. Accordingly, host system 102 may further include a coherent attached processor proxy (CAPP) 110 that participates on behalf of peripheral component 104 in the determination of the system-wide coherency responses for peripheral component 104 within a timeframe that satisfies the timing requirements of the coherency protocol of host system 102. Although not required, it is preferable if CAPP 110 is programmable and can therefore be programmed to support any of multiple different peripheral components 104 to which host system 102 may be coupled by serial communication link 108.

Figure 2:
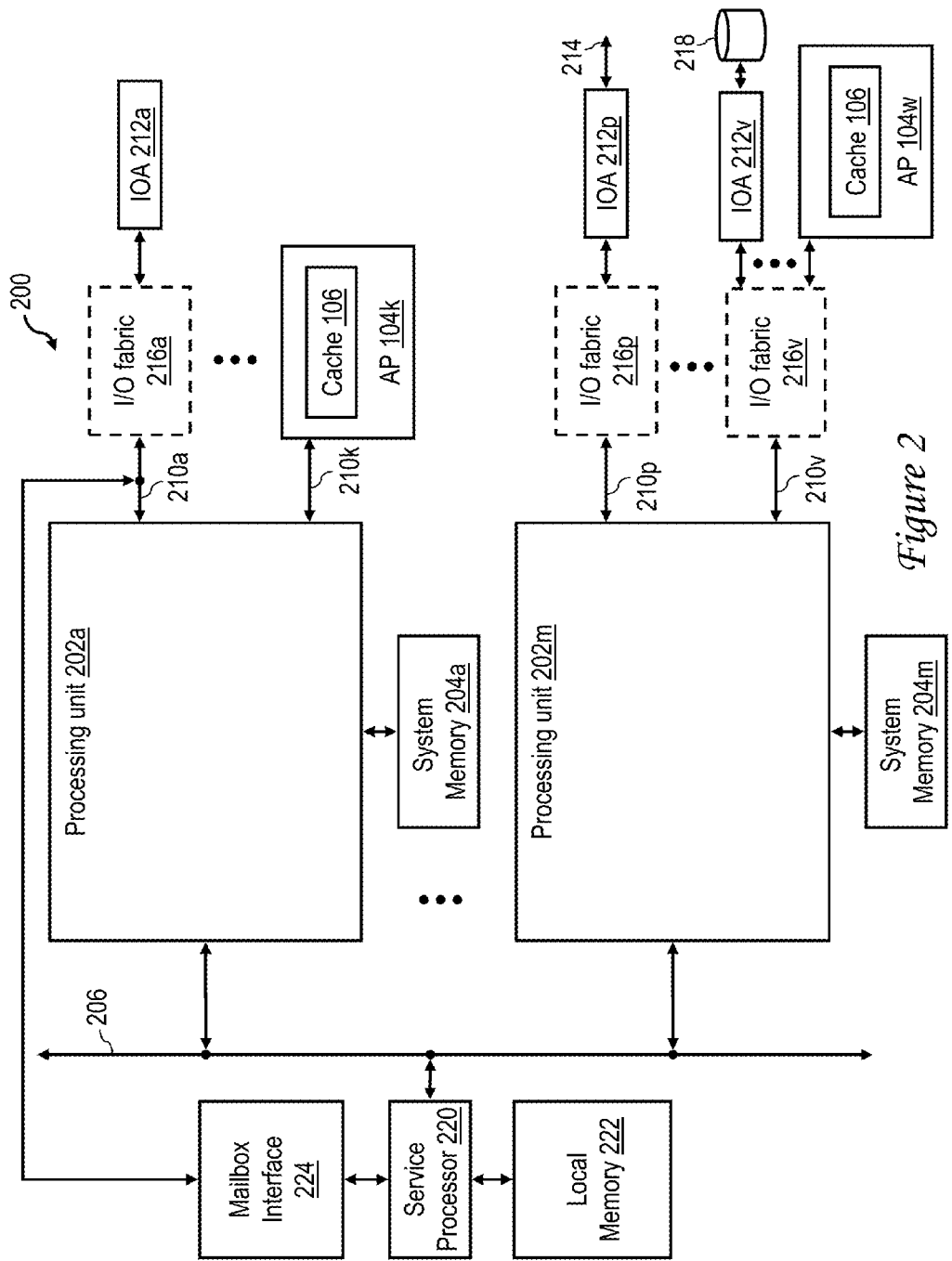
FIG. 2 is a more detailed block diagram of an exemplary embodiment of the data processing system of FIG. 1.

Referring now to FIG. 2, there is depicted a more detailed block diagram of a data processing system 200 that is one of the numerous possible embodiments of data processing system 100 of FIG. 1. Data processing system 200 may be implemented, for example, with one of the IBM POWER servers, a product line of International Business Machines Corporation of Armonk, N.Y.

In the depicted embodiment, data processing system 200 is a distributed shared memory multiprocessor (MP) data processing system including a plurality of processing units 202a-202m. Each of processing units 202a-202m is supported by a respective one of shared system memories 204a-204m, the contents of which may generally be accessed by any of processing units 202a-202m. Processing units 202a-202m are further coupled for communication to a system fabric 206, which may include one or more bused, switched and/or wireless communication links. The communication on system fabric 206 includes memory access requests by processing units 202 requesting coherent access to various memory blocks within various shared system memories 204a-204m.

As further shown in FIG. 2, one or more of processing units 204a-204m are further coupled to one or more communication links 210 providing expanded connectivity. For example, processing units 202a and 202m are respectively coupled to communication links 210a-210k and 210p-210v, which may be implemented, for example, serial communication interfaces. As shown, communication links 210 can be utilized to support the direct or indirect coupling of input/output adapters (IOAs) such as IOAs 212a, 212p and 212v, which can be, for example, network adapters, storage device controllers, display adapters, peripheral adapters, etc. For example, IOA 212p, which is network adapter coupled to an external data network 214, is coupled to communication link 210p optionally through an I/O fabric 216p, which may comprise one or more switches and/or bridges. In a similar manner, IOA 212v, which is a storage device controller that controls storage device 218, is coupled to communication link 210v optionally through an I/O fabric 216v. As discussed with reference to FIG. 1, communication links 210 can also be utilized to support the attachment of one or more peripheral components 104, either directly to a processing unit 202 (as is the case for attached processor (AP) 104k, which is coupled to processing unit 202a by communication link 210k) or indirectly to a processing unit 202 through an intermediate I/O fabric 216 (as can be the case for AP 104w, which can be coupled to processing unit 202m through communication link 210v and optional I/O fabric 216v).

Data processing system 200 further includes a service processor 220 that manages the boot process of data processing system 200 and thereafter monitors and reports on the performance of and error conditions detected in data processing system 200. Service processor 220 is coupled to system fabric 206 and is supported by a local memory 222, which may include volatile (e.g., dynamic random access memory (DRAM)) and non-volatile memory (e.g., non-volatile random access memory (NVRAM) or static random access memory (SRAM)). Service processor 220 is further coupled to a mailbox interface 224 through which service processor 220 communicates I/O operations with communication link 210a.

Those of ordinary skill in the art will appreciate that the architecture and components of a data processing system can vary between embodiments. For example, other devices and interconnects may alternatively or additionally be used. Accordingly, the exemplary data processing system 200 given in FIG. 2 is not meant to imply architectural limitations with respect to the claimed invention.

Figure 3:
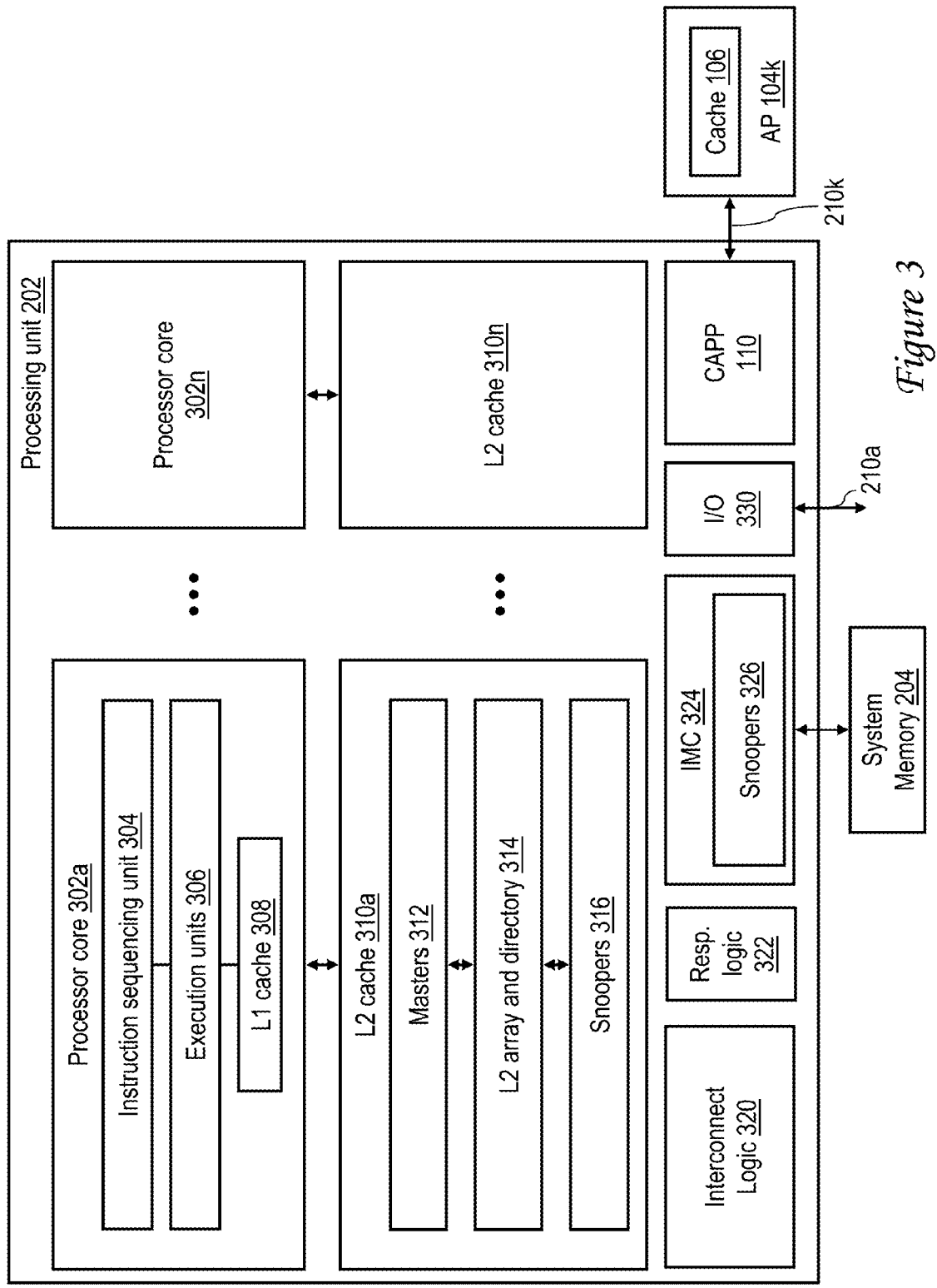
FIG. 3 is a more detailed block diagram of an exemplary embodiment of a processing unit in the data processing system of FIG. 2.

With reference now to FIG. 3, there is illustrated a more detailed block diagram of an exemplary embodiment of a processing unit 202 in data processing system 200 of FIG. 2. In the depicted embodiment, each processing unit 202 is preferably realized as a single integrated circuit chip having a substrate in which semiconductor circuitry is fabricated as is known in the art.

Each processing unit 202 includes multiple processor cores 302a-302n for independently processing instructions and data. Each processor core 302 includes at least an instruction sequencing unit (ISU) 304 for fetching and ordering instructions for execution and one or more execution units 306 for executing instructions. The instructions executed by execution units 306 may include, for example, fixed and floating point arithmetic instructions, logical instructions, and instructions that request read and write access to a memory block in the coherent address space of data processing system 200.

The operation of each processor core 302a-302n is supported by a multi-level volatile memory hierarchy having at its lowest level one or more shared system memories 204 (only one of which is shown in FIG. 3) and, at its upper levels, one or more levels of cache memory. As depicted, processing unit 202 includes an integrated memory controller (IMC) 324 that controls read and write access to an associated system memory 204 in response to requests received from processor cores 302a-302n and operations received on system fabric 206.

In the illustrative embodiment, the cache memory hierarchy of processing unit 202 includes a store-through level one (L1) cache 308 within each processor core 302a-302n and a store-in level two (L2) cache 310. As shown, L2 cache 310 includes an L2 array and directory 314, masters 312 and snoopers 316. Masters 312 initiate transactions on system fabric 206 and access L2 array and directory 314 in response to memory access (and other) requests received from the associated processor cores 302. Snoopers 316 detect operations on system fabric 206, provide appropriate responses, and perform any accesses to L2 array and directory 314 required by the operations. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

As further shown in FIG. 3, processing unit 202 includes integrated interconnect logic 320 by which processing unit 202 is coupled to system fabric 206, as well as an instance of response logic 322, which in embodiments employing snoop-based coherency, implements a portion of a distributed coherency messaging mechanism that maintains coherency of the cache hierarchies of processing unit 202. Processing unit 202 further includes one or more integrated I/O (input/output) controllers 330 supporting I/O communication via one or more communication links 210. Processing unit 202 additionally includes a CAPP 110 as previously described.

Those skilled in the art will appreciate that data processing system 200 can include many additional or alternative components. Because such additional components are not necessary for an understanding of the present invention, they are not illustrated in FIG. 3 or discussed further herein.

Figure 4:
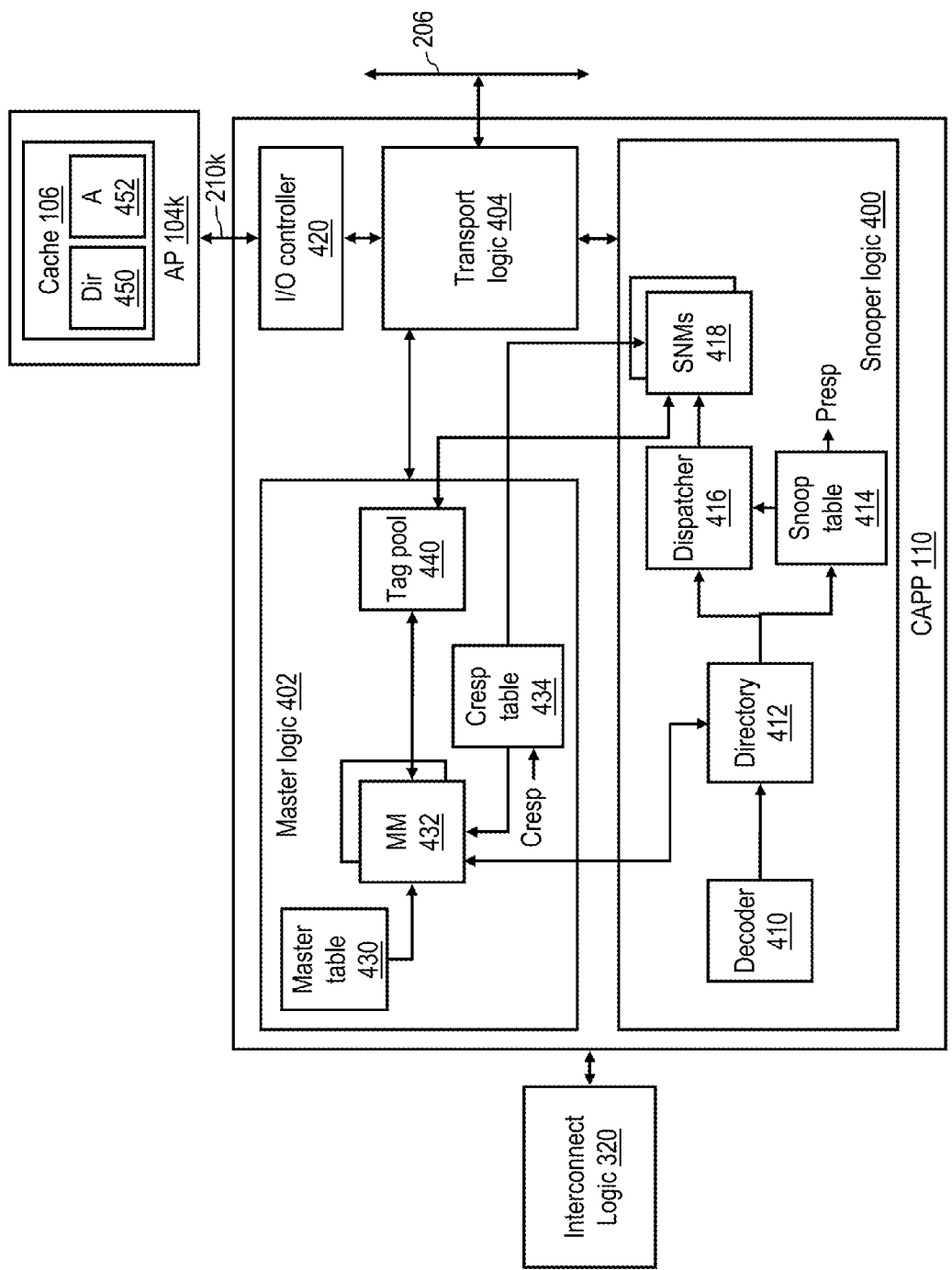
FIG. 4 is a more detailed block diagram of an exemplary embodiment of the coherent attached processor proxy (CAPP) in the processing unit of FIG. 3.

Referring now to FIG. 4, there is depicted a more detailed block diagram of an exemplary embodiment of the coherent attached processor proxy (CAPP) 110 in processing unit 202 of FIG. 3. As shown, CAPP 110 is coupled to interconnect logic 320 to permit CAPP 110 to transmit and receive address, control and coherency communication via system fabric 206 on behalf of (i.e., as a proxy for) a peripheral component 104 (e.g., AP 104k) to which it is coupled by a serial communication link (e.g., serial communication link 210k).

CAPP 110 includes snooper logic 400, master logic 402, transport logic 404, and an I/O controller 420. Transport logic 404 has two interfaces, a first by which transport logic 404 manages communication over serial communication link 210k as necessary to comport with the signaling protocol employed by serial communication link 210k and/or AP 104k, and a second by which transport logic 404 manages data communication with system fabric 206. Thus, transport logic 404 may packetize data, may apply message encapsulation/decapsulation or encryption/decryption, may compute, append and/or verify checksums, etc., as is known in the art.

I/O controller 420 controls serial communication with AP 104k via serial communication link 210k. In various embodiments, serial communication link 210k may include multiple (e.g., 4, 8, 16, etc.) physical serial communication channels (lanes). In some implementations, one or more of these physical serial communication channels may be (or can be configured by I/O controller 420 and/or AP 104k to be) simplex or duplex. In some embodiments, I/O controller 420 and/or AP 104k can selectively configure the number of the physical serial communication channels that are available for use to less than the total number of physical serial communication channels within serial communication link 210k (e.g., so that 4 of 8 serial channels are used). Further, in some embodiments, I/O controller 420 and/or AP 104k can selectively configure a frequency of communication over the physical serial communication channels within serial communication link 210k.

Snooper logic 400 includes a decoder 410, a directory 412 of the contents of the data array 452 of the cache 106 of the associated AP 104k, a snoop table 414, a dispatcher 416, and a set of snoop machines (SNMs) 418. Decoder 410 of snooper logic 400 receives memory access requests from system fabric 206 via interconnect logic 320 and optionally but preferably decodes the snooped memory access requests into a corresponding set of internal snoop requests. The set of internal snoop requests implemented by decoder 410 is preferably programmable (and in some embodiments dynamically reprogrammable) to decouple the design of CAPP 110 from that of AP 104k and to allow flexibility in mapping the memory access requests of host system 102 to the request set of the associated AP 104k. Following decoding by decoder 410, the target address specified by the memory access request is utilized to access directory 412 in order to look up the coherence state of the target address with respect to AP 104k. It should be noted that the coherence state indicated by directory 412 may not match or correspond to that indicated by directory 450 of cache 106 in AP 104k. Nevertheless, the use of the coherence state information in directory 412 in CAPP 110 rather than directory 450 enables the system-wide coherency response to be determined for each memory access request within a bounded time frame determined by host system 102 to be met, regardless of whether serial communication link 210k and/or AP 104k have lower speed or reliability than other components of data processing system 200 (e.g., CAPP 110).

The coherence state specified by directory 412 and the internal request determined by decoder 410 are then utilized by snoop table 414 to determine an appropriate partial response (Presp) to the snooped memory access request. In response to at least the internal snoop request determined by decoder 410, coherence state output by directory 412 and Presp output by snoop table 414, dispatcher 416 determines whether or not any further action is or may possibly be required in response to the memory access request (e.g., update of directory 412, sourcing the target cache line to the requester, etc.), and if so, dispatches a snoop machine 418 to manage performance of that action.

Master logic 402 optionally but preferably includes a master table 430 that maps memory access and other requests originated by AP 104k and received by CAPP 110 to internal master requests. As with the mapping performed by decoder 410 of snooper logic 400, the mapping performed by master table 430 decouples the design of CAPP 110 and AP 104k and enables CAPP 110 to programmably support a wide variety of diverse peripheral components 104. In at least some embodiments, master table 430 supports dynamic reprogramming. Master logic 402 further includes a set of master machines (MMs) 432 that services internal master requests output by master table 430. In a typical case, a master machine 432 allocated to service an internal master request determines and manages an action to be performed to service the internal request (e.g., initiating a directory update and/or memory access request on system fabric 206) based at least in part on the coherence state indicated for the target address of the master request by directory 412. Data transfers to and from AP 104k via CAPP 110 in response to the operation of snooper logic 400 and master logic 402 are tracked via operation tags allocated from tag pool 440.

As further indicated in FIG. 4, master logic 402 includes a combined response (Cresp) table 434. In response to receipt of a combined response representing the systemwide coherence response to a request, Cresp table 434 translates the combined response received from system fabric 206 into an internal Cresp message and distributes the internal Cresp message to master machines 432 and snoop machines 418. Again, the translation of combined responses to internal Cresp messages by Cresp table 434 decouples the design of AP 104k from that of host system 102 and enables the interface provided by CAPP 110 to be programmable and thus support a variety of diverse peripheral components 104.

As noted above, several data structures (e.g., decoder 410, snoop table 414, master table 430 and Cresp table 434) within CAPP 110 are preferably programmable, and in some embodiments, dynamically programmable. In one implementation, a control processor (e.g., service processor 220 or any of processing units 202 running supervisory code (e.g., hypervisor)) dynamically updates the data structures by first instructing AP 104 to invalidate its directory 450 and quiesce. The control processor then updates one or more of the data structures within CAPP 110. In response to completion of the updates, the control processor instructs AP 104 to resume normal processing. It should also be noted that the configurations of master table 430 and snoop table 414 affects not only the mapping (translation) of incoming AP requests and snooped requests, respectively, but also the behavior of MMs 432 and SNMs 418. That is, the behavior of MMs 432 in response to AP requests and the messages transmitted on system fabric 206 and to AP 104 are also preferably determined by the configuration of master table 430. Similarly, the behavior of SNMs 418 in response to snooped requests and the messages transmitted on system fabric 206 and to AP 104 are preferably determined by the configuration of snoop table 414. Thus, the behaviors and messages of MMs 432 and SNMs 418 can be selectively changed by appropriate reprogramming of master table 430 and snoop table 414.

Figure 5:
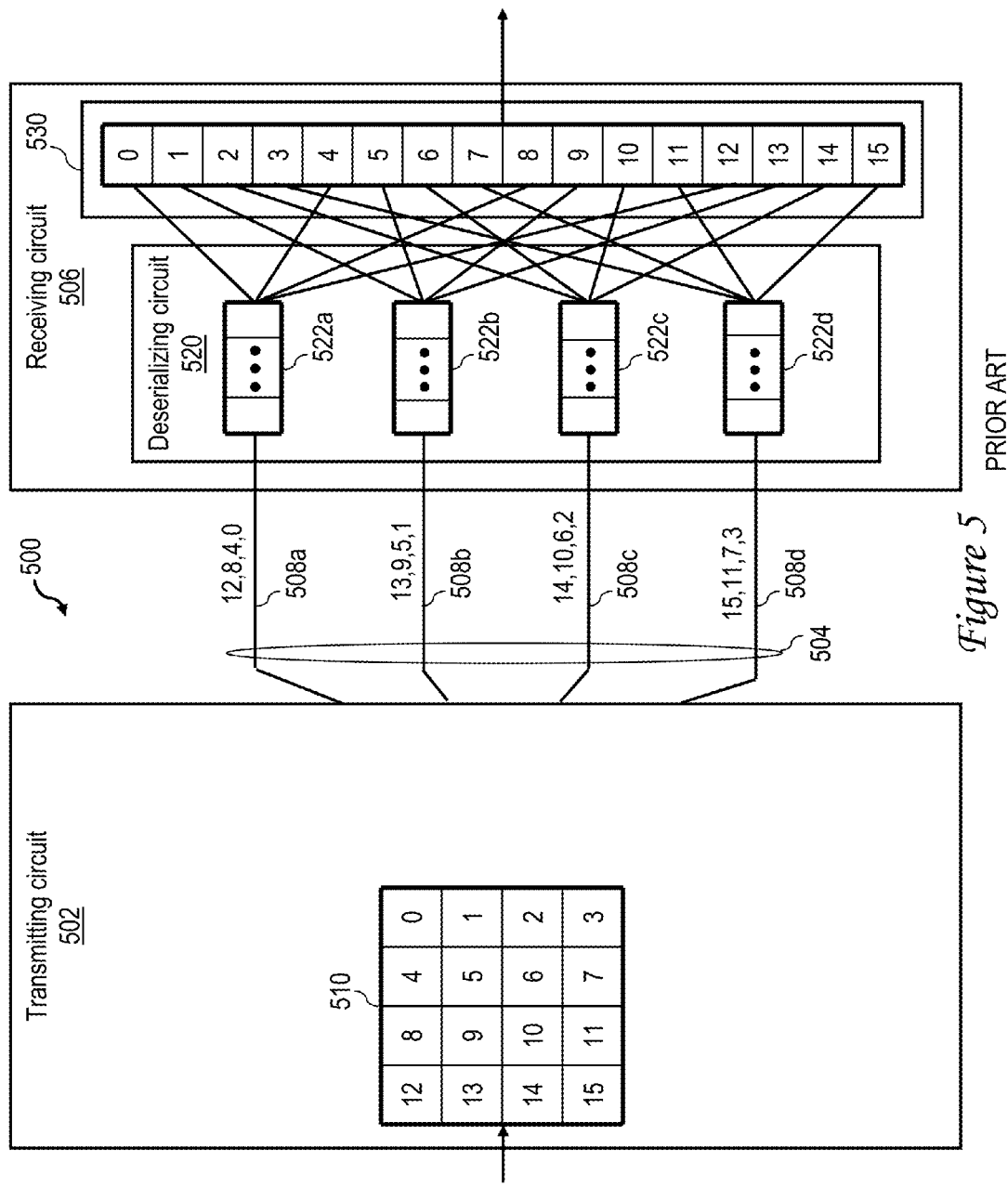
FIG. 5 is a block diagram of a serial interface in accordance with the prior art.

With reference now to FIG. 5, there is depicted a block diagram of a prior art serial interface 500. Serial interface 500 includes a transmitting circuit 502 and a receiving circuit 506 coupled from communication by a serial communication link 504. As shown, transmitting circuit 502 includes an input buffer 510 that receives and buffers a frame including M bytes of data, which in this example is two 8-byte data words, but in other implementations could include any desired number of data bytes (e.g., 4 bytes, 8 bytes, etc.). In this example, input buffer 510 receives the frame over 4 cycles, with bytes 0-3 being received at time t0, bytes 4-7 being received at time t1, bytes 8-11 being received at time t2, and bytes 12-15 being received at time t3.

In this example, transmitting circuit 502 transmits the data bytes buffered within input buffer 510 to receiving circuit 506 via multiple channels (also referred to as lanes) 508a-508d forming communication link 504. As shown, in the prior art, when the data width of communication link 504 is less than the size of the data to be transmitted, transmitting circuit 502 transmits the data to receiving circuit 506 strictly in byte and bit order. Thus, transmitting circuit 502 first transmits bytes 0 to 3 via channels 508d-508d, respectively, following by bytes 4 to 7, followed by bytes 8 to 11, and finally by bytes 12 to 15.

Receiving circuit 506 includes a deserializing circuit 520 and an output buffer 530. Deserializing circuit 520 includes a plurality of receive buffers 522 (e.g., receive buffers 522a-522d), which are each coupled to receive data bytes transmitted on a respective one of channels 508a-508d. As depicted in FIG. 5, deserializing circuit 520 employs the illustrated wiring to reorder the bytes of the frame received in receive buffers 522 in output buffer 530 to reform the original frame. Output buffer 530 can then output the frame for further processing and/or storage.

Under the assumption that wire delays are negligible, the wiring complexity exhibited in receiving circuit 506 of FIG. 5 has no impact on communication performance via serial interface 500. However, in actual implementations, this assumption is not valid, and communication performance via a serial interface is dependent on not only wire delays, but also on the relative operating clock frequencies and minimum sizes of transmitting circuit 502 and receiving circuit 506. In particular, in cases in which transmitting circuit has a higher operating clock frequency and a smaller minimum line size than receiving circuit, the present invention recognizes that it would be desirable to reorder the data bytes transmitted via the serial interface within the transmitting circuit in order to reduce and/or minimize the aggregate wire lengths required in the receiving circuit to reassemble a frame.

Figure 6:
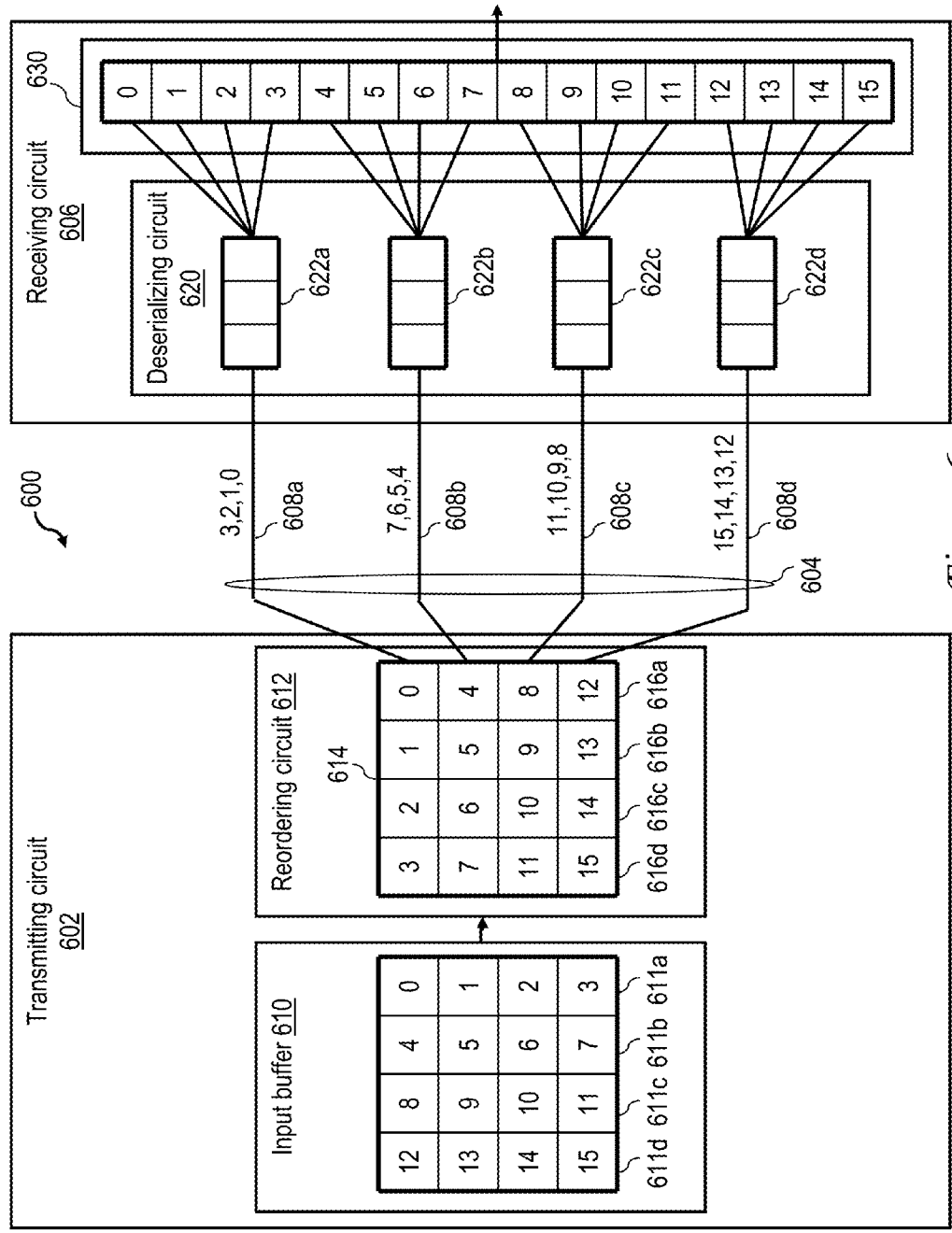
FIG. 6 is a block diagram of a serial interface in accordance with one embodiment of the present invention.

Referring now to FIG. 6, there is depicted a detailed block diagram of a serial interface 600 in accordance with one embodiment of the present invention. In the depicted embodiment, serial interface 600 includes a transmitting circuit 602 and a receiving circuit 606 coupled for communication by a serial communication link 604. In the following discussion, serial interface 600 is described with receiving circuit 606 implemented in AP 104k and with transmitting circuit 602 implemented in CAPP 110 (e.g., within I/O controller 420), which generally is implemented in integrated circuit having a higher operating clock frequency and smaller line size (i.e., minimum feature size) than utilized to implement AP 104k. For example, in some implementations, the clock ratios of transmitting circuit 602 to receiving circuit 606 may be, for example, 2:1, 4:1, 8:1, 16:1, 32:1, 64:1, etc. Further, in some embodiments, serial communication link 604 may be simplex, while in other embodiments, serial communication link 604 can be duplex.

Serial communication link 604 includes multiple channels (or lanes), which in this embodiment include four channels 608a-608d. In other embodiments, serial communication link 604 may include a number of channels N that is greater than or equal to 2 and less than the length M in bytes of the data packets to be transmitted over serial communication link 604.

As shown, transmitting circuit 602 includes an input buffer 610 that receives and buffers a frame including M bytes of data, which in this exemplary embodiment is 16 bytes, but in other embodiments could include any desired number of data bytes (e.g., 4 bytes, 8 bytes, 32 bytes, 64 bytes, etc.). It is generally preferred, however, if M is evenly divisible by an integer N greater than one. The M bytes of data within each frame form a number N of segments 611a-611d each including S contiguous bytes, where S is an integer greater than 1 and is equal to M/N. In this case, input buffer 610 receives the frame over 4 cycles, with segment 611a (e.g., bytes 0-3) being received at time t0, segment 611b (e.g., bytes 4-7) being received at time t1, segment 611c (e.g., bytes 8-11) being received at time t2, and segment 611d (e.g., bytes 12-15) being received at time t3.

Transmitting circuit 602 additionally includes a reordering circuit 612 coupled to receive data from input buffer 610. Reordering circuit 612 includes a reorder buffer 614 having a depth D (i.e., a number of entries 616a-616d), which is preferably greater than or equal to S. Each of the plurality of entries 616a-616d has a width in bytes equal to N, the number of channels 608 in serial communication link 604. In some embodiments, reordering circuit 612 advances data from entry 616d to entry 616c to entry 616b to entry 616a and then transmits the data of entry 616a on channels 608. In other embodiments, reordering circuit 612 is instead configured as a multi-ported structure, allowing data to be inserted into or transmitted from multiple of (e.g., any of) entries 616.

Reordering circuit 612 reorders the bytes of frames received from input buffer 610 in non-sequential order. That is, as shown, reorder buffer 614 does not buffer the 16 bytes of an input frame with entry 616a buffering bytes 0-3, entry 616b buffering bytes 4-7, entry 616c buffering bytes 8-11, and entry 616d buffering bytes 12-15, such that the individual bytes of the frame are transmitted in the same sequence in which they appear in the frame. Instead, reordering circuit 612 reorders the data bytes of the input frame according to per-segment byte order so that each channel 608 of serial communication link 604 transmits only the bytes of a respective one of the M/N segments of the input frame and so that the same byte position of all segments of the input frame are transmitted via channels 608a-608d at the same time. Thus, in this example, reordering circuit 612 buffers in entry 616a the first byte of each segment 611 (i.e., bytes 0, 4, 8 and 12), buffers in entry 616b the second byte of each segment (i.e., bytes 1, 5, 9 and 13), buffers in entry 616c the third byte of each segment (i.e., bytes 2, 6, 10, and 14), and buffers in entry 616d the fourth byte of each segment (i.e., bytes 3, 7, 11, and 15). As further shown in FIG. 6, reordering circuit 612 transmits via channels 608a-608d the first byte of all segments to receiving circuit 606 in a first beat, the second byte of all segments to receiving circuit 606 in a second beat, and so on.

Receiving circuit 606 includes a deserializing circuit 620 and an output buffer 630. Deserializing circuit 620 includes a plurality of receive buffers 622 (e.g., receive buffers 622a-622d), which are each coupled to receive data bytes transmitted on a respective one of channels 608a-608d. Each receive buffer 622 preferably has a depth of at least S−1, if S represents the number of bytes per segment. As depicted in FIG. 6, deserializing circuit 620 reassembles the segments of the frame received in receive buffers 622 in output buffer 630 to reform the original frame. Output buffer 630 can then output the frame for further processing and/or storage.

By implementing the byte reordering performed by transmitting circuit 602 in processing unit 202 prior to transmission, performance is improved over prior art implementations that would instead perform the reordering in a peripheral component 104. Further, because the minimum line size of processing unit 202 is generally smaller than that of peripheral component 104, the circuit area utilized to implement the byte reordering functionality is generally less than if implemented in peripheral component 104.

In a preferred embodiment, reordering circuit 612 is configurable for different numbers of channels 608, different communication frequencies over serial communication link 604, and/or sizes of frames. In some implementations, transmitting circuit 602 negotiates the number of channels 608 and the communication frequency of the channels 608 with receiving circuit 606 utilizing conventional techniques.

Figure 7:
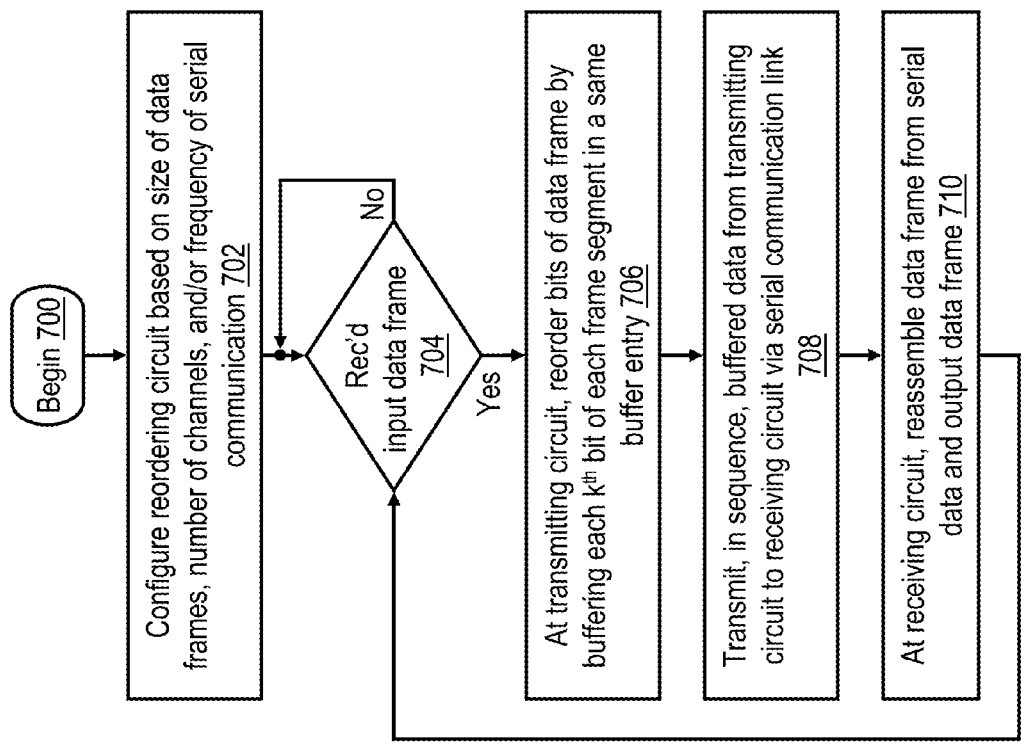
FIG. 7 is a high level logical flowchart of serial communication via a serial interface in accordance with one embodiment.

Referring now to FIG. 7, there is illustrated a high level logical flowchart of a method of serial communication in accordance with one embodiment. To promote understanding, the process of FIG. 7 will be described with reference to the embodiment of a serial interface shown in FIG. 6.

The process of FIG. 7 begins at block 700 and then proceeds to block 702, which illustrates transmitting circuit 602 configuring reordering circuit 612 based on the size of the frames to be communicated, the number of channels 608 within the serial communication link 604, and/or the frequency of the serial communication via channels 608. In at least some embodiments, some of these parameters can be set by appropriately setting one or more configuration registers in transmitting circuit 602 via software and/or hardware. Further, in some embodiments, transmitting circuit 602 and receiving circuit 606 can jointly negotiate the number of channels 608 and the frequency of serial communication utilizing a conventional training communication sequence over serial communication link 604.

Following the configuration illustrated at block 702, transmitting circuit 602 awaits receipt of an input frame in input buffer 610 (block 704). In response to receipt of an input frame in input buffer 610, reordering circuit 612 reorders the bytes of the input frame by buffering each $k^{th}$ byte of each frame segment together in the same entry 616 of reorder buffer 614 (block 706). In the example shown in FIG. 6 in which the frame includes 4 segments (16 bytes divided by 4 channels yields 4 segments each containing 4 contiguous bytes of the input frame), the first byte of each segment is buffered in entry 616a, the second byte of each segment is buffered in entry 616b, the third byte of each segment is buffered in entry 616c, and the fourth byte of each segment is buffered in entry 616d.

Block 708 illustrates transmitting circuit 602 sequentially transmitting the data buffered within reorder buffer 614 to receiving circuit 606 via serial communication link 604 in multiple beats, where the initial beat includes the first data byte of each segment of the input frame, the second beat includes the second data byte of each segment, and so on. Receiving circuit 606 receives the data transmitted on channels 608 in receive buffers 622 and deserializes the data by reassembling the input frame in output buffer 630 (block 710). It should be noted that each receive buffer 622 only receives data byte within a respective one of the plurality of segments of the input frame, simplifying the wiring and logic utilized to reconstruct the frame. Once reassembled, the frame is output from output buffer 630, for example, for storage or further processing.

As indicated in FIG. 7 by the process returning to block 704, the serial communication process can be performed iteratively for a plurality of input frames. It should be appreciated, however, that given the available buffering, a second frame can be received and at least partially buffered within reorder buffer 614 prior to the conclusion of transmission of the data of a first frame.

Figure 8:
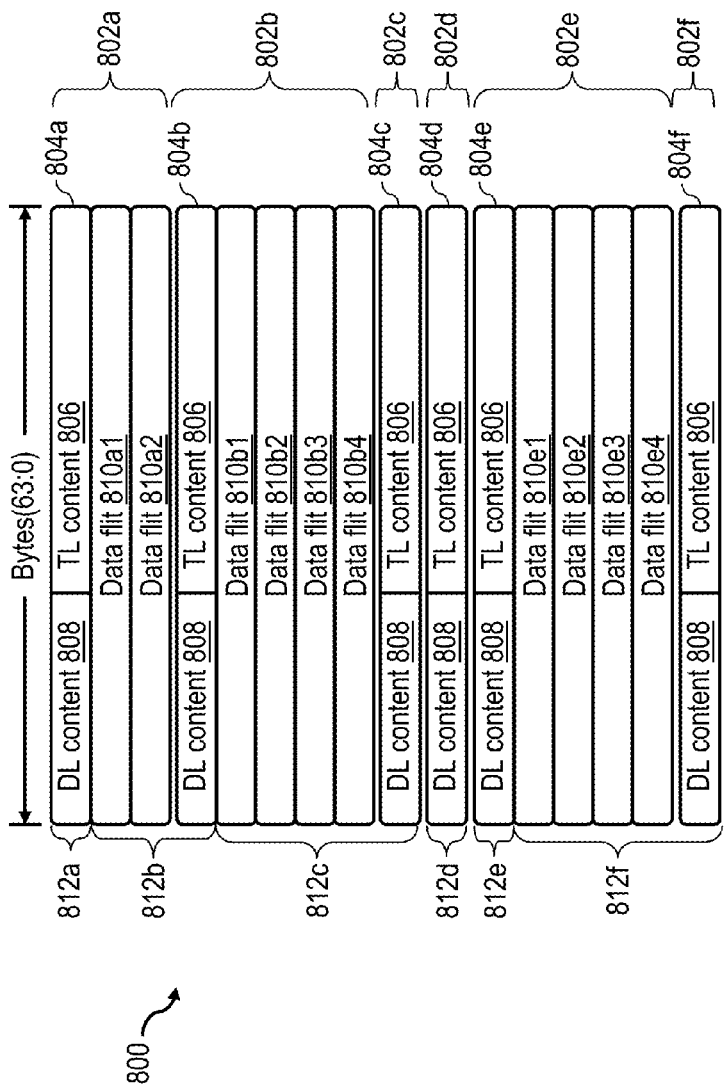
FIG. 8 depicts a sequence of exemplary frames communicated via a serial interface in accordance with one embodiment.

Referring now to FIG. 8, there is depicted an exemplary sequence 800 of frames 802 communicated via a serial interface in accordance with one embodiment. For example, sequence 800 may be transmitted from one of a CAPP 110 and an AP 104 (a transmitting circuit) to the other (a receiving circuit) via a serial interface, such as a communication link 210.

In this example, each frame 802a-804f in sequence 800 is formed of one or more consecutive "flits" (FLow control unITs) all having a common length, which in this example is fixed at 64 bytes. In other examples, the flits can all have a longer or shorter alternative common length, such as 16, 32, or 128 bytes. The flits forming each frame 802 include a single control flit 804 and zero or more data flits 810. For example, frames 802c, 802d and 802f include only control flits 804c, 804d, and 804f, respectively, while frame 802a includes control flit 804a and data flits 810a1-810a2, frame 802b includes control flit 804b and data flits 810b1-810b4, and frame 802e includes control flit 804e and data flits 810e1-810e4. By convention, the frames 802 forming sequence 800 are transmitted from the transmitting circuit to the receiving circuit via the serial interface from right to left (i.e., byte 0 to byte 63) and from top to bottom (i.e., frame 802a to frame 804f). Implementing all data and control flits with a common length guarantees data alignment and thus avoids the need to perform any byte rotation at the receiving circuit.

As further shown in FIG. 8, each control flit 804 preferably includes both a transaction layer (TL) content field 806 and a data link (DL) layer content field 808, which preferably have respective common fixed lengths in all control flits 804. For example, in one embodiment in which each flit is 64 bytes in length, TL content fields 806 may be 56 bytes in length (e.g., bytes 55:0), and DL content fields 808 may be 8 bytes in length (e.g., bytes 63:56).

Figure 9:
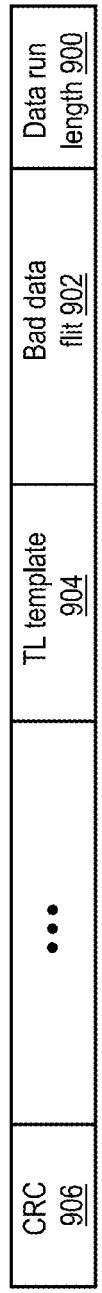
FIG. 9 is a more detailed block diagram of a data link (DL) layer content field of a control flit of a frame in accordance with one embodiment.

With reference now to FIG. 9, there is illustrated a more detailed block diagram of an exemplary DL content field 808 of a control flit 804 of a frame 802 in accordance with one embodiment. In this example, DL content field 808 includes a data run length field 900 specifying the number of data flits 806 in the frame 802 (which, assuming no idle flits, also indicates the number of flits until the next control flit 804 in sequence 800). In one example, valid values for data run length field 900 are {0 . . . 8}. Exemplary DL content field 808 also includes a bad data flit field 902 indicating which, if any, of the data flits received in the immediately prior frame 802 contain bad (erroneous) data. In addition, DL content field 808 includes a TL template field 904 that specifies the locations of command or response opcodes in the TL content field 806 sharing the same control flit 804. As discussed below in greater detail with reference to FIG. 10, TL template field 904 preferably specifies the opcode locations by identifying which one of a plurality of different predetermined templates was used to format TL content field 806.

DL content field 808 also includes a data protection field, such as CRC field 906, which provides a code that enables the receiving circuit to verify whether or not data received via the serial interface is corrupt. Unlike conventional data protection codes that appear at the end of a frame and are computed from, and thus protect, only the contents of that frame, CRC 906 is computed over and protects the control flit 804 in which it appears, as well as the data flit(s) 810, if any, of the immediately preceding frame 802. FIG. 8 illustrates this innovative data protection scheme at reference numerals 812*a*-812*f*. As shown at reference numerals 812*a*, 812*d*, and 812*e*, for frames 802*a*, 804*d* and 804*e*, which are preceded by frames 802 including no data flit 810, the CRC contained in CRC field 906 is computed over and protects the data integrity of only the control flit 804 itself. However, for each of frames 802*b*, 802*c* and 802*f*, the CRCs contained in CRC field 906 is computed over and protects the data integrity of both the control flit 804*b*, 804*c* or 804*f* and the data flits 810 of the preceding frame 802. Thus, for example, the CRC in control flit 804*f* of frame 802*f* protects not only control flit 804*f*, but also data flits 810*e*1-810*e*4 of frame 802*e*, as shown at reference numeral 812*f*. This placement of the data protection field facilitates the lowest possible latency processing of command flits 804 at the receiving circuit and enables the data flits 810 of a preceding frame 802 to be processed at the receiving circuit with no more than a single flit delay, while preserving data alignment and without resorting to wasteful padding (e.g., the insertion of trailing zeros) to fill out a flit dedicated to communicating the data protection field.

Referring now to FIG. 10, a table is given illustrating various templates that may be selected to define the structure of the TL content field 806 of a control flit 804 of a frame 802 in accordance with one embodiment. In this example, TL content field 806 is subdivided into a 16 fixed length slots, each of which is 28 bits (3½ bytes) in length. Of course, in other embodiments, the number and length of slots may vary.

As indicated, different templates for TL content field 806 are signified by different values of TL template field 904 in DL content field 808. A template field value of '00,' which in some embodiments designates the default template, specifies that slots 0-1 are utilized to communicate the return of transmission credits, slots 4-9 (i.e., 6 slots) communicate the opcode of a command or response, and the remainder of the slots are unused (reserved). Template field values of '01,' '02,' and '03' alternatively allocate the available slots of TL content field 806 to four 4-slot opcodes, eight 2-slot opcodes, or two 4-slot and one 6-slot opcodes, respectively.

The chart given in FIG. 10 further illustrates that TL content field 806 may be utilized to communicate metadata describing the data communicated in one or more associated data flits 810 and/or to directly communicate data associated with an opcode contained in TL content field 806. For example, a template field value of '06' specifies a format that allocates slots for three command and/or response opcodes and the use of two slots (i.e., slots 2-3) to communicate metadata regarding data contained in the data flits 806 of the frame 802. Alternatively, a template field value of '07' specifies a format of TL content field 806 that allocates slots for two command and/or response opcodes (in slots 10-11 and 12-15), uses two slots (i.e., slots 8-9) to communicate metadata regarding data contained in the data flits 806 of the frame 802, and employs eight slots (i.e., slots 0-7) to communicate data associated with one of command and/or response opcodes found in slots 10-11 or slots 12-15. In embodiments in which an opcode (a command or response) may have associated data (e.g., store data to be written to data storage by a write command), a flag within the command/response slot can be utilized to indicate if the command or response has associated data and, if so, if the data is communicated in TL content field 806 or in a separate data flit 810. In one preferred embodiment, the data flits 810 associated with commands and/or responses in the TL content field 806 are ordered in the same order as the commands and/or responses in TL content field 806 so that no data tag is needed to communicate the association between the commands/responses and their respective data.

In some embodiments, the templates supported by the serial interface are predetermined by configuration of the transmitting and receiving circuits. In other embodiments, the transmitting and receiving circuits are configured to negotiate which templates can be employed, for example, as a part of the link startup procedure. In either case, one template (e.g., template '00') can advantageously be designated as a default template. To reduce processing latency at the receiving circuit, the transmitting circuit can employ this default template for the initial frame after the serial interface has been idle. In this manner, the receiving circuit can have a priori knowledge of the location of the command(s) and/or response(s) in the TL content field 806 of the control flit 804 of the initial frame 802 after idle prior to receiving the DL content field 808 (and the TL template field 904 it contains).

As has been described, communication efficiency via a serial interface can be improved through implementation of a frame as disclosed herein. The frame preferably includes, at a minimum, a control flit that specifies at least one command and/or response. In some cases, the control flit may include multiple commands and/or responses to enable greater utilization of the bandwidth of the serial interface. The frame may additionally include one or more data flits specifying only data. Command and data flits preferably employ a common fixed flit length, thus ensuring all data communicated over the serial interface is aligned. The control flit preferably includes a data protection code (e.g., CRC) computed over the control flit and the data flits, if any, of the previous frame (which may be unrelated to the data content, if any, of the current frame).

Figure 11:
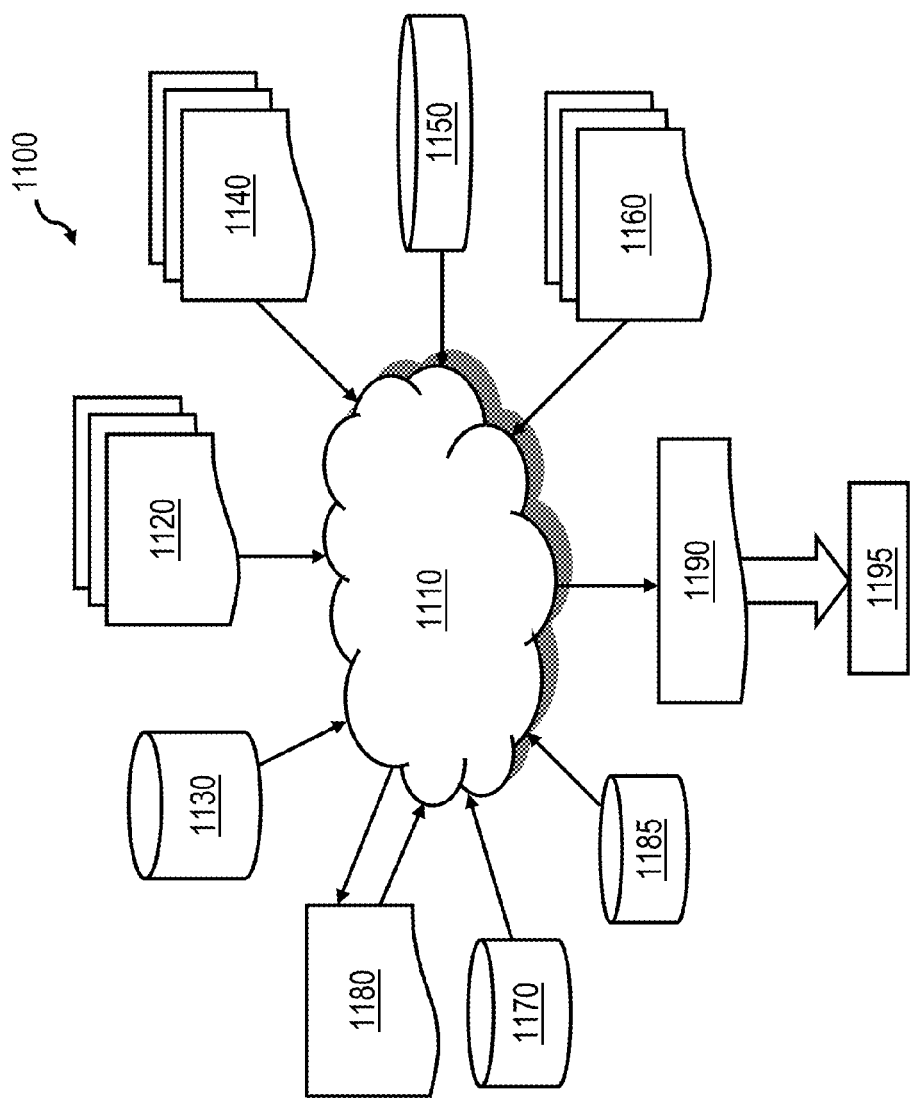
FIG. 11 is a data flow diagram of an exemplary design process.

With reference now to FIG. 11, there is illustrated a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of the design structures and/or devices described above. The design structures processed and/or generated by design flow 1100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 1120 that is preferably processed by a design process 1110. Design structure 1120 may be a logical simulation design structure generated and processed by design process 1110 to produce a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD) such as implemented by a core developer/designer. When encoded on a machine-readable data transmission, gate array, or storage medium, design structure 1120 may be accessed and processed by one or more hardware and/or software modules within design process 1110 to simulate or otherwise functionally represent an electronic component, circuit, electronic or logic module, apparatus, device, or system such as those illustrated herein. As such, design structure 1120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1110 preferably employs and incorporates hardware and/or software modules for synthesizing, translating, or otherwise processing a design/simulation functional equivalent of the components, circuits, devices, or logic structures shown herein to generate a netlist 1180 which may contain design structures such as design structure 1120. Netlist 1180 may comprise, for example, compiled or otherwise processed data structures representing a list of wires, discrete components, logic gates, control circuits, I/O devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1110 may include hardware and software modules for processing a variety of input data structure types including netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1140, characterization data 1150, verification data 1160, design rules 1170, and test data files 1185 which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1190 may comprise a compiled, executable HDL simulation model that functionally simulates the devices shown herein.

Design structure 1190 may also employ a data format used for the exchange of layout data of integrated circuits and/or symbolic data format (e.g., information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1190 may then proceed to a stage 1195 where, for example, design structure 1190: proceeds to tape-out, is released to manufacturing, is released to a mask house, is sent to another design house, is sent back to the customer, etc.

In at least one embodiment, an integrated circuit includes a transmitting circuit configured to be coupled to a physical serial interface having a bit width. The transmitting circuit is configured to transmit, via the physical serial interface, a frame including multiple aligned flits all of an equal fixed length that is an integer multiple of the bit width of the physical serial interface. The multiple flits include both a control flit specifying at least a command to be performed by a recipient of the command and a data flit providing data to be operated upon through performance of the command. The control flit includes a data protection code computed over the control flit and a data flit of a previously transmitted frame.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a storage device (e.g., volatile or non-volatile memory, optical or magnetic disk or other statutory manufacture) that stores program code that can be processed by a data processing system. As employed herein, a "storage device" is specifically defined to include only statutory articles of manufacture and to exclude energy per se, transmission media per se, and transitory propagating signals per se. Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. An integrated circuit, comprising:
   a transmitting circuit configured to be coupled to a physical serial interface having a bit width, wherein the transmitting circuit is configured to transmit, via the physical serial interface, a frame including multiple aligned flits all of an equal fixed length that is an integer multiple of the bit width of the physical serial interface, wherein the multiple flits include both a control flit specifying at least a command to be performed by a recipient of the command and a data flit providing data to be operated upon through performance of the command, wherein the control flit includes a data protection code computed over the control flit and a data flit of a previously transmitted frame.

2. The integrated circuit of claim 1, wherein the control flit includes multiple commands.

3. The integrated circuit of claim 2, wherein the control flit includes a template field indicating to which of a plurality of templates the control flit conforms, wherein multiple ones of the plurality of templates include differing numbers of command slots.

4. The integrated circuit of claim 1, wherein the multiple flits include multiple data flits.

5. The integrated circuit of claim 1, wherein:
   the command is a first command; and
   the control flit includes a second command and data to be operated upon through performance of the second command.

6. A method of communication via a physical serial interface having a bit width, the method comprising:
   a transmitting circuit forming a frame including multiple aligned flits all of an equal fixed length that is an integer multiple of the bit width of the physical serial interface, wherein the multiple flits include both a control flit specifying at least a command to be performed by a recipient of the command and a data flit providing data to be operated upon through performance of the command, wherein the control flit includes a data protection code computed over the control flit and a data flit of a previously transmitted frame; and
   the transmitting circuit transmitting the frame to a receiving circuit via the physical serial interface.

7. The method of claim 6, wherein the control flit includes multiple commands.

8. The method of claim 7, wherein the control flit includes a template field indicating to which of a plurality of templates the control flit conforms, wherein multiple ones of the plurality of templates include differing numbers of command slots.

9. The method of claim 6, wherein the multiple flits include multiple data flits.

10. The method of claim 6, wherein:
    the command is a first command; and
    the control flit includes a second command and data to be operated upon through performance of the second command.

11. A design structure tangibly embodied in a storage device for designing, manufacturing, or testing an integrated circuit, the design structure comprising:
    a transmitting circuit configured to be coupled to a physical serial interface having a bit width, wherein the transmitting circuit is configured to transmit, via the physical serial interface, a frame including multiple aligned flits all of an equal fixed length that is an integer multiple of the bit width of the physical serial interface, wherein the multiple flits include both a control flit specifying at least a command to be performed by a recipient of the command and a data flit providing data to be operated upon through performance of the command, wherein the control flit includes a data protection code computed over the control flit and a data flit of a previously transmitted frame.

12. The design structure of claim 11, wherein the control flit includes multiple commands.

13. The design structure of claim 12, wherein the control flit includes a template field indicating to which of a plurality of templates the control flit conforms, wherein multiple ones of the plurality of templates include differing numbers of command slots.

14. The design structure of claim 11, wherein the multiple flits include multiple data flits.

15. The design structure of claim 11, wherein:
    the command is a first command; and
    the control flit includes a second command and data to be operated upon through performance of the second command.

16. The design structure of claim 11, wherein the design structure comprises a hardware description language (HDL) design structure.

* * * * *

UNITED STATES PATENT AND TRADEMARK OFFICE
CERTIFICATE OF CORRECTION

PATENT NO. : 10,268,617 B2  
APPLICATION NO. : 15/723967  
DATED : April 23, 2019  
INVENTOR(S) : Lonny Lambrecht et al.

Page 1 of 1

It is certified that error appears in the above-identified patent and that said Letters Patent is hereby corrected as shown below:

On the Title Page

Item (72) Inventors: "William S. Starke, Round Rock, TX" should read -- William J. Starke, Round Rock, TX --

Signed and Sealed this  
Third Day of September, 2019

Andrei Iancu  
*Director of the United States Patent and Trademark Office*